Feb. 19, 1957 W. A. MALTHANER 2,782,256

TIMING CIRCUITS

Filed March 5, 1953 6 Sheets-Sheet 1

INVENTOR
W. A. MALTHANER
BY James I. Falk
ATTORNEY

INVENTOR
W. A. MALTHANER
BY
ATTORNEY

Feb. 19, 1957 W. A. MALTHANER 2,782,256

TIMING CIRCUITS

Filed March 5, 1953 6 Sheets-Sheet 3

INVENTOR
W. A. MALTHANER

BY [signature]

ATTORNEY

Feb. 19, 1957 W. A. MALTHANER 2,782,256

TIMING CIRCUITS

Filed March 5, 1953 6 Sheets-Sheet 4

INVENTOR
W. A. MALTHANER

BY [signature]

ATTORNEY

Feb. 19, 1957 W. A. MALTHANER 2,782,256

TIMING CIRCUITS

Filed March 5, 1953 6 Sheets-Sheet 5

INVENTOR
W. A. MALTHANER

BY Jones W. Falk

ATTORNEY

Feb. 19, 1957 W. A. MALTHANER 2,782,256

TIMING CIRCUITS

Filed March 5, 1953 6 Sheets-Sheet 6

INVENTOR
W. A. MALTHANER

BY James W. Falk

ATTORNEY

United States Patent Office 2,782,256

Patented Feb. 19, 1957

2,782,256

TIMING CIRCUITS

William A. Malthaner, New Providence, N. J., assignor to Bell Telephone Laboratories, Incorporated, New York, N. Y., a corporation of New York Application March 5, 1953, Serial No. 340,472

14 Claims. (Cl. 179—7.1)

This invention relates to timing circuits and more particularly to such circuits employable with electrical systems utilizing magnetic drums for the storage and control of information.

In many electrical systems, it is necessary that the presence of a given condition be timed. This timing may be of two types; it may either comprise a check that the condition has remained for a predetermined minimum duration or a noting of an exact interval. Such timing requisites may occur in any of a number of computer, analyzer, or other systems but are particularly present in telephone systems and switching networks. In a telephone system, examples of the first type of timing might comprise timing a hang-up condition to advise the switching network that if the condition remains for a predetermined minimum interval it indicates a true hang-up and the connection through the switching network can be dropped, as opposed to the shorter occurrence of the hang-up condition when a subscriber is flashing the operator. Similarly if a short or fault appears in a line the system is likely to confuse that fault with a signal from the subscriber unless some circuitry is provided to advise the system that, if the fault remains for a given period, it is a fault and not a true signal. Examples of the second type of timing may be in the timing of the calls for accounting purposes, in which case relatively accurate timing is required.

These timing periods may also be of greatly different durations. A hang-up may be indicated by a signal occurring for at least a half a second, a fault by a signal occuring for at least one minute, and a call timed up to a period of one hour. Priorly in systems employing magnetic drums, very short timing periods have been timed by counting revolutions of the drum, which may comprise counting periods of one-sixtieth of a second, and longer periods have been timed independently. A telephone system incorporating magnetic drums for the storage of information and the control of the switching functions is disclosed in application Serial No. 340,471, filed March 5, 1953, now Patent 2,723,311, issued November 8, 1955, of W. A. Malthaner and H. E. Vaughan.

It is a general object of this invention to provide an improved circuit for the timing of the presence of conditions in an electrical system and more particularly to provide such a circuit employable in systems utilizing alterable memory elements having a plurality of memory sections, such as magnetic drums.

More specifically, objects of this invention include providing improved circuits for the timing of a condition in an electrical circuit for a predetermined minimum interval to a desired degree of accuracy, the timing of a condition in an electrical circuit for an exact period, the timing of any one of a number of mutually independent conditions that might occur at a particular point or line in an electrical system, each of which is to be timed for a different interval, and the timing of periods from the order of tenths of seconds to hours in a single and simplified circuit.

In one specific illustrative embodiment of this invention, the occurrence of a condition on a line in an electrical system, which condition it is desired to time for a predetermined minimum interval, is noted by the marking of a cell in the slot assigned to that line on a magnetic drum when that condition and a timer enabling signal occur simultaneously. In accordance with general usage, the portions of the magnetic drum which can be read or written on at any instant are called slots, each slot being permanently assigned to a line. A single elemental portion of the magnetic drum is called a cell, while all the cells in which a given type of information may be written for all the lines comprise a channel. During each subsequent revolution of the drum the mark placed in the cell as noted above is read but no action is taken by the circuit until the next simultaneous occurrence of the timer enabling signal and a read signal from the timer started channel of the magnetic drum, provided that the condition on the line has not ceased, as described further below. At this time a second mark is placed in a timing completed channel, which mark is read on the next revolution of the drum and applied to a work circuit. The work circuit is thus informed that the condition being timed remained on the line for at least the interval between successive timer enabling signals. This interval may be made any desired amount by merely varying the timer enabling circuit supplying the timer signals.

If the condition being timed ceases before the occurrence of the second timer enabling signal, the mark placed in the timing started channel is erased. Similarly the marks placed in both the timing started and timing completed channels are erased on operation of the associated work circuit.

The approximate timing of the condition by this circuit is 1.5S±.5S where S is the interval between successive timer enabling signals. For certain applications wherein greater accuracy is required a number of timer channels on a magnetic drum may be employed. In accordance with this specific embodiment of the invention, the presence of the condition is again detected by the initial concomitant occurrence of the condition on the line in the electrical system and a timer enabling signal. Subsequent occurrences of the condition and the timer enabling signal then cause marks to be placed in other channels on the magnetic drum, as in a binary code, until a predetermined number of timer enabling signals has been counted. In this embodiment, considering that there are C states of the magnetic channels, the number of sub-intervals counted between the noting of the occurrence of the condition and its continued duration will be C–1; the timed interval is then measured between the limits (C–2)S and (C–1)S to a possible error of ± .5S thereby attaining high accuracy.

In each of the above-described embodiments it will generally be the case that the interval being timed will be relatively short, as a number of seconds or a minute. However, by combining such circuits in tandem considerably longer peroids may be readily timed. Thus if it is desired to time the duration of a condition in an electrical system which may remain for an hour or more, a first circuit may be employed to ascertain the continued duration of the condition for one minute by counting in a binary code in channels on the drum timer enabling pulses spaced 0.1 minute apart. The read pulse on completion of the timing of this first circuit will then comprise the timer enabling signal for the next circuit and will also cause erasure of the marks placed in the timing channels of the first circuit. This second circuit may time the condition for a period of 10 minutes and in turn start timing in a third circuit, which may time up to 60 minutes and enable a fourth circuit which times hours.

Then on the cessation of the condition on the line in the electrical system, the condition of each of the timing circuits affords an indication of the elapsed time. Thus if a condition ceases when the fourth circuit has counted to 2, the third circuit to 3, the second circuit to 7, and the first circuit to 5, all in binary code, the elapsed time would be 2 hours, 37.5 minutes. This is accurate to $\pm\frac{1}{2}$ of the time between enabling pulses for the first circuit, or $\pm$.05 minute.

In certain electrical systems it is also often desirable to time different conditions that may occur independently on a single line or at a single point in the system and to time each of these conditions for a distinct period of time. Such occur in telephone systems wherein the presence of a fault, a hang-up condition, signalling information, etc., all may be indicated on an interoffice trunk by signals of different polarities and/or durations. In another specific embodiment of this invention, each of these mutually independent conditions may be timed in a single circuit wherein the particular condition of that line being timed is noted in a code in channels on a magnetic drum each possible condition having a different code, and those channels read on each revolution of the drum to ascertain the occurrence of a change in the condition of the line. A different timer enabling signal is applied to the circuit for each possible condition of the lines, the particular timer signal being employed in any one timing operation depending on the condition being timed. The simultaneous occurrence of a particular condition of a line and the timer enabling signal for that condition causes the writing of marks in a timing started and timing completed channel, as described for the above embodiments.

In each of the embodiments of this invention, simultaneous timing of conditions on any desired number of lines may occur. Thus if conditions appearing on a number of subscriber lines or interoffice trunks in a telephone system are to be timed, each line or trunk will have a slot on the drum assigned to it and, hence, one cell in each of the channels employed in the timing circuits of the above-described embodiments. As the timer enabling pulse is applied to the timing circuits for a duration exactly equivalent to one revolution of the drum, it can, in that period, be applied to time conditions appearing on all of the lines.

While this invention is described with reference to the timing of conditions on but a single line, it is to be understood that a condition appearing on any line which has a slot assigned to it on the magnetic drum can be timed, the particular line associated with the timing circuits at any instant being dependent on which line is being scanned, and which line thus has its cells beneath the reading/writing heads of the magnetic drum, at a particular instant. Therefore a large number of conditions, appearing on different lines, can be timed simultaneously in accordance with this invention.

It is a feature of this invention that a timing circuit comprise a pair of memory sections of an alterable memory device in which are recorded successive simultaneous occurrences of a condition being timed and a timer enabling signal applied to the circuit at predetermined regular intervals. More specifically, in accordance with a feature of this invention, the memory selections are two channels on a magnetic drum.

It is a further feature of this invention that the accuracy of timing and the duration of the timed interval may be increased by employing additional channels on the magnetic drum for the noting of sub-intervals of the desired timing period.

It is a feature of one specific embodiment of this invention that the sub-intervals within the timed period be counted in code form in channels on the magnetic drum.

It is a feature of another specific embodiment of this invention that any one of a number of mutually exclusive conditions appearing on a line in an electrical system may be timed to ascertain the continuance of that condition for a predetermined minimum by continuously noting the condition of the line in coded form in a plurality of channels on the magnetic drum, each possible condition of that line being indicated by one of the codes, a mark being written in a timing started channel on the conjoint appearance of a particular condition in the condition memory channels and a timer enabling signal unique to that condition.

It is a feature of this invention that on the disappearance of the condition before the end of the interval between the starting and completion of the timing, the marks in the timing channels and in any condition memory channels are erased A complete understanding of this invention and of these and various other features thereof may be gained from consideration of the following detailed description and the accompanying drawing, in which.

Figure 1:
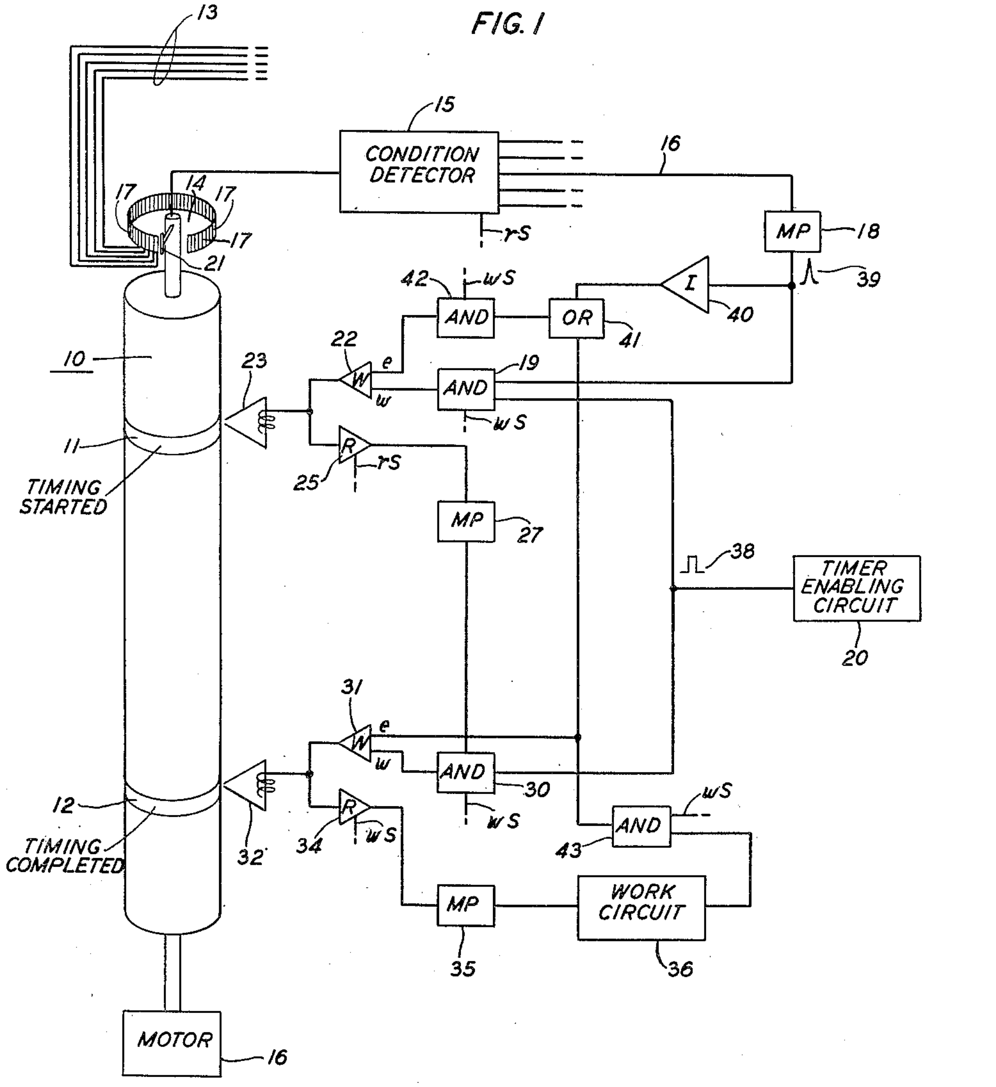
Fig. 1 is a schematic representation, mainly in block form, of one specific illustrative embodiment of this invention particularly adapted to the determination of the continuance of a condition on a line for at least a predetermined minimum interval.

Referring now to the drawing, one specific illustrative embodiment of this invention is depicted in Fig. 1 and comprises a magnetic drum 10 on which a first channel 11 has been assigned for indications of the start of the timing period and a second channel 12 has been assigned for indications of the conclusion of the timing period, the drum being rotated by a motor 16 as is known in the art. The signals to be timed may originate in any of a large number of circuits or systems, but in the specific embodiment depicted it is assumed that the timing is concerned with the condition of telephone lines 13. One signal on a telephone line that it is desirable to time can be identified as a hang-up signal. When a telephone subscriber is using his instrument he may momentarily open his line without desiring to be disconnected. This may occur if he idly dials a number while waiting on the line, the line opening one or more times for each digit dialed; or it may occur if he attempts to flash the operator. Telephone experience has indicated that if a line remains open for approximately one-half second, a hang-up has occurred. Longer periods are not utilized as it often happens that a subscriber upon completion of one call hangs up and then almost immediately picks up the telephone again to commence a second call.

Another signal that occurs on a telephone line that it is desirable to time is the signal indicating that a telephone subscriber has initially picked up his instrument. In this case telephone experience has indicated that if no further action is taken by the subscriber within about one minute, it is most probable that the telephone instrument has been accidentally knocked off its cradle or misplaced inadvertently or that there is a short in the line.

A large number of lines 13 may be scanned to detect these and other line signals by a capacitive scanner, shown diagrammatically at 14, which may advantageously be driven by a common shaft with the magnetic drum 10. This scanner may be of the general type described in, inter alia, application Serial No. 185,929, filed September 21, 1950 by N. D. Newby, now Patent 2,679,551, issued May 25, 1954. Briefly the scanner may comprise a number of stationary line plates 17 arranged around the circumference of a ring and a moving search plate 21 carried past the line plates. The search plate 21 may be supported on the same shaft as the drum 10 and thus also rotated by the motor 16.

These signals are applied to a condition detector circuit 15, which may advantageously amplify the signals, restore their direct current voltage levels, and detect which condition existed on any particular line. Such a circuit, which applies an output pulse to a particular lead 16 for a particular existing condition on the scanned line, is described in an application Serial No. 340,585, filed March 5, 1953, by W. A. Cornell, now Patent 2,691,729, issued October 12, 1954.

This output pulse is applied, through a monopulser circuit 18 discussed further below, to a logic circuit 19. A write synchronizing pulse and a timer enabling pulse from a timer enabling circuit 20 are also applied to the logic circuit 19. This logic circuit comprises a combination of diodes and other elements such that a pulse will only appear on the output lead from this circuit when pulses are present at all the input leads, that is, when a timer enabling pulse, a write synchronizing pulse *w*S, and a signal pulse are all present. Such a circuit has become known in the art as an "AND" circuit and shall so be referred to in this specification. Similarly it is known in the art to provide diode logic circuits which will provide an output pulse on the presence of a pulse at any of the input leads thereto; such a circuit is known as an "OR" circuit and shall be so referred to herein. Examples of such circuits and a discussion of their operation may be found in chapter 10 of "The Design of Switching Circuits" by Keister, Ritchie, and Washburn (Van Nostrand Company, 1951).

On the simultaneous occurrence of the three conditions noted above a "write" pulse is transmitted from the "AND" circuit 19 to the writing amplifier 22 and the pulse is stored by being written by the writing head 23 in the cell assigned to that particular line in the channel 11. The writing amplifier 22, magnetic head 23, and reading amplifier 25 may be of the type disclosed in application Serial No. 201,156 filed December 16, 1950 by J. H. McGuigan, O. J. Murphy and N. D. Newby, now Patent 2,700,148, issued January 18, 1955 each amplifier 22 having a write input lead *w* and an erase input lead *e*.

In one specific embodiment of this invention depicted in Fig. 1, the timer enabling circuit produces an enabling pulse once every one-half second, and the duration of the pulse is equal to exactly one revolution of the drum. However, we may consider the more general case of the timer enabling circuit producing a pulse of a duration of one revolution of the drum once every S seconds. Thus while a signal pulse is applied to the "AND" circuit 19 once during each revolution of the drum, that circuit is itself enabled only once every S seconds.

When the particular cell in which has been stored the information that the timing period has commenced again comes under the reading-writing head 23 during the rotation of the drum 10, an output pulse will be generated and applied, through the reading amplifier 25 and a monopulser circuit 27, to a second "AND" circuit 30. Subsequently the timer enabling pulse and a write synchronizing pulse are also applied to the "AND" circuit 30. When all three pulses occur simultaneously a pulse is transmitted by the "AND" circuit 30 to the writing amplifier 31 and to the reading-writing head 32 to place a mark in the appropriate cell in the timing ended channel 12. On the next revolution of the drum 10 this mark is read by the reading-writing head 32 and a pulse applied through the reading amplifier 34 and the monopulser circuit 35 to a work circuit 36 which takes some action on the receipt of the information that the timing period has ended with the signal still applied to the telephone line.

Write and read synchronizing pulses, noted on the drawing as *w*S and *r*S, respectively, are advantageously employed to assure that the writing and reading of all marks in each slot on the magnetic drum occur simultaneously. As it is known that the reading pulse is generated by the magnetic condition of the cell on the drum before the time at which marks are written on the drum, it is advantageous to have the read pulse continue in some circuits until the time for writing information in the cell has passed. Thus as the output read pulse from the reading amplifier 25 occurs before the write synchronizing pulse applied to the AND circuit 30, a monopulser circuit 27 is employed to prevent the disappearance of the read pulse until after the occurrence of the write synchronizing pulse, thus assuring proper action of the AND circuit 30. Furthermore, the disappearance of the read synchronizing pulse before the occurrence of a write synchronizing pulse insures that marks will not be read on the same revolution of the drums on which they are written. As the output pulses from the condition detector circuit 15 may advantageously be also determined in time by a read synchronizing pulse, monopulser circuit 18 is positioned between the circuit 15 and the AND circuit 19. Similarly, the monopulser 35 is utilized between the read amplifier 34 and the work circuit 36. These monopulser circuits may advantageously be single shot multivibrators comprising a normally conducting and a normally non-conducting electron tube as are known in the art.

We have considered above the operation of one specific illustrative embodiment of my invention for timing the occurrence of an event over a period of at least S seconds' duration. Turning again to Fig 1, let us now consider the operation of this specific embodiment if the event does not last for this minimum period. A positive pulse 39 is produced by the monopulser circuit 18 in response to the output of the condition detector circuit 15, and a negative pulse is simultaneously produced at the output of an inverter circuit 40. If no positive pulse 39 is applied to the inverter circuit 40, the output of the inverter circuit is a positive voltage which is applied through an OR circuit 41 and an AND circuit 42 to the erase lead of the writing amplifier 22. Thus, in the absence of a condition being timed, on each occurrence of the write synchronizing pulse, the output of the AND circuit 42 will cause an erasure of any mark placed in the timing started channel in the particular cell assigned to the line being scanned at that instant. The inverter circuit 40 may comprise a grounded cathode triode so that a positive pulse is applied to the erase lead of the writing amplifier 22, which, in this specific embodiment, is responsive only to positive pulses. In response to this positive voltage applied to the writting amplifier 22, the magnetic head 23 will erase the information placed in the cell in the timing started channel for that particular line. As this timing started mark has been erased, the next occurrence of the timer enabling pulse at AND circuit 30 will not be able to cause that gate to open to write a timing completed mark in the appropriate cell in channel 12.

The OR circuit 41 is employed because it is also necessary to erase the timing started and completed marks after completion of the timed interval. An output pulse is thus taken from the work circuit 36 and applied both to the erase lead of the writing amplifier 31 and to the OR circuit 41; this is advantageously done through an AND circuit 43 also controlled by the write synchronizing pulse.

Figure 2:
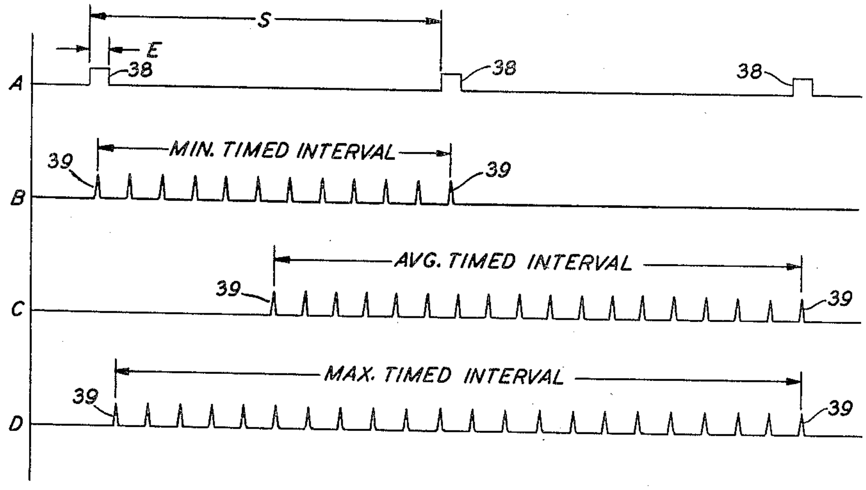
Fig. 2 is a time diagram of the possible occurrences of various pulses and signals in the circuit of Fig. 1.

Referring now to Fig. 2, there are shown time plots of the occurrences of various pulses illustrating the minimum, average, and maximum timed intervals. In Fig. 2A, the enabling pulses 38 occur once every S seconds and last for E seconds, E corresponding to the time necessary for exactly one revolution of the magnetic drum. If a signal pulse 39 indicating a condition to be timed occurs for the first time during the period E, as depicted in Fig. 2B, an indication is immediately written in the proper cell in the timing started channel 11 and S seconds later later when the pulse 39 again occurs during the period E, a mark is placed in the cell in the timing completed channel 12 advising the work circuit 36 that the condition has lasted for the prescribed minimum time.

If the signal pulse 39 first occurs during the middle of period S, then the timing started mark is not placed until the occurrence of the next enabling pulse 38 and the period timed will be approximately 1.5S; this, which is shown in Fig. 2C, is the average timed period. The maximum timed period, as shown in Fig. 2D, occurs when the initial signal pulse 39 arrives just after the end of an enabling pulse E; then the timed period is $2S+E$, which for all practical purposes is 2S. This can be appreciated from the fact that in one specific embodiment the drum 10 rotated at a speed of 60 revolutions per second so that the period E was $\frac{1}{60}$ of a second. If hang up indications are being timed, the period S may be ½ second whereas if a short-circuit indication is being timed the period S may be one minute.

While the timed interval is thus (1.5S±0.5S) the condition on the line is being timed to determine whether it lasts for at least a duration of S, so that the timing intervals more than S do not introduce errors, and the maximum additional timed period is itself just S.

Figure 3:
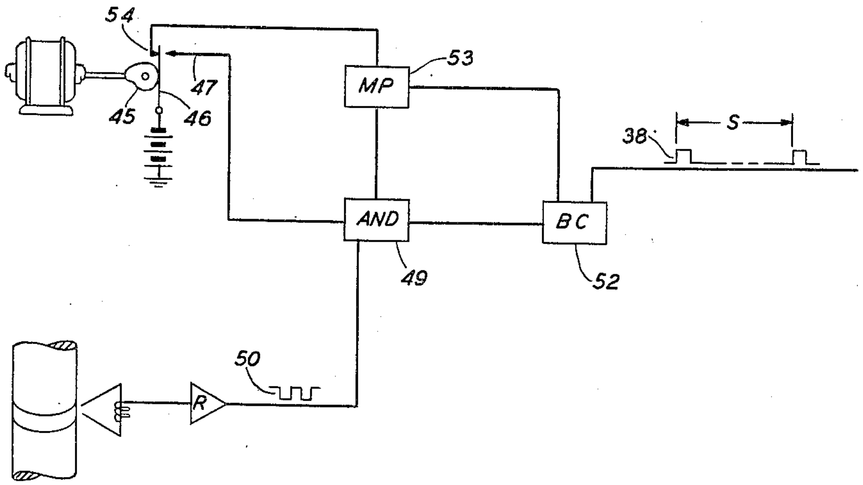
Fig. 3 is a schematic representation, mainly in block form, of one timer enabling circuit that may be employed to provide the timer enabling signals in the embodiment of Fig. 1.

The timer enabling circuit 20 that produces a pulse of a duration E equal to one revolution of the drum once every S seconds may be of various types. One such circuit is shown in Fig. 3. A motor driven cam 45 causes contact members 46 and 47 to close and apply an enabling negative voltage 48 to an AND circuit 49. A pulse 50 is also applied to this AND circuit from a reading amplifier which reads a mark placed in one cell of an otherwise vacant channel on the magnetic drum. We can consider for the moment that the simultaneous occurrence of these two negative pulses to the AND circuit causes it to apply a pulse to a binary counter or flip-flop circuit 52 which, as is known in the art, will cause an output to be produced due to the shift in conduction from the normally conducting tube to the normally non-conducting tube of the circuit. This output will remain until the occurrence of the next pulse 50 from the reading amplifier exactly one revolution of the drum later, the contacts 46 and 47 being closed during this time interval. The binary counter circuit 52 will thus produce the enabling pulse 38 for a period of E seconds, exactly one revolution of the drum. In order to prevent the occurrence of another pulse during this one closure of the contact members 46 and 47, the resetting of the binary counter circuit 52 after one revolution of the drum also produces an output to fire a monopulser circuit 53 which remains on for a time longer than that during which it is expected that the contacts 46 and 47 will remain closed. This monopulser circuit normally applies a negative voltage to the AND circuit 49 which, together with the negative pulse 50 and the negative voltage 48 through the contacts 46 and 47, allows the AND circuit 49 to be enabled. When the monopulser circuit 53 has been fired, however, a positive pulse is applied to the AND circuit 49, thereby disabling it. The opening of the contacts 46 and 47 may advantageously cause closure of the contacts 46 and 54 to apply a negative voltage to the monopulser 53 to reset it.

In the embodiment described above, the occurrence of an event on one of the lines 12 was timed to an interval of 1.5S±.5S by employing two channels on a magnetic drum 10 and a timer enabling circuit 20 which enables the drum circuits once every S seconds for exactly one revolution of the drum. This embodiment is entirely satisfactory for the recognition of conditions having a minimum duration of 2S and which can be recognized after a duration of S. For certain applications, however, it may be desirable that the timing of the condition on a line 12 be determined with greater accuracy.

Figure 4:
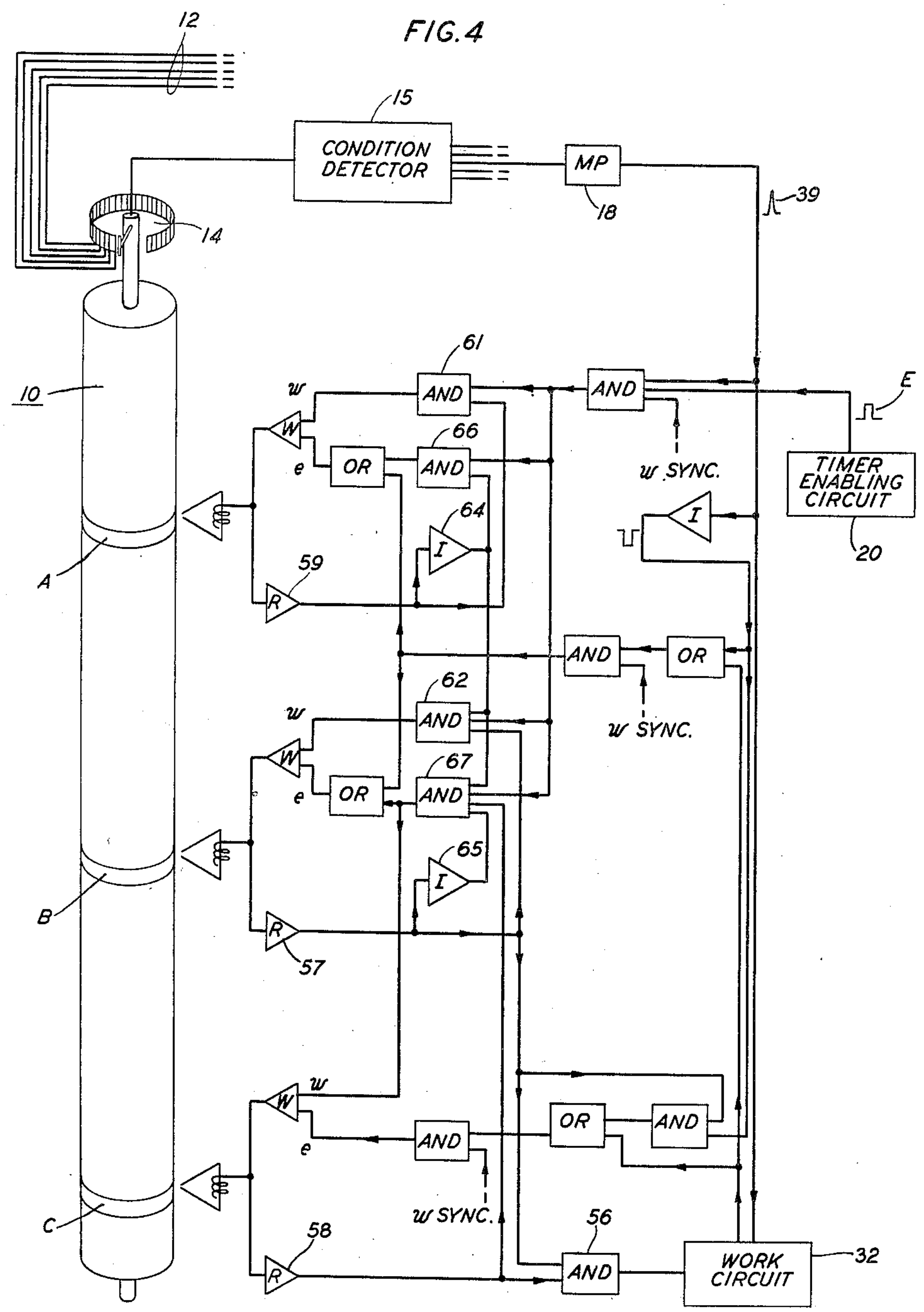
Fig. 4 is a schematic representation, mainly in block form, of another specific illustrative embodiment of this invention wherein the minimum duration of the condition on a particular line is determined with great accuracy.

Turning now to Fig. 4, there is shown another specific illustrative embodiment of this invention wherein greater accuracy is attained in accordance with this principle of this invention by counting, during the persistence of the condition to be timed, the occurrences of the timer enabling pulses E in a binary code in channels on a magnetic drum 10, a given number of such pulses corresponding to the completion of the interval to be timed. If a group of $r$ drum channels are employed on a binary basis in which the presence or absence of a mark in a channel represents a digit in a binary number, there are then C states or conditions possible, where $C=2^r$. If these conditions of the counter are used to designate timing points in the timed interval, the number of subintervals of that timed interval will be C–1, as there is one normal or zero condition and C–1 conditions of the counter to designate the elapsed time intervals. The timed interval can thus be measured between the limits (C–2)S and (C–1)S, so that the possible error, which is again ±½S, is a considerably smaller percentage of the timed interval, whereby greater accuracy is attained.

The particular time S between enabling pulses E and the number of states of counter required will depend on the duration of the interval to be timed and the accuracy required. Specifically, if T is the nominal interval and $f$ is the decimal fractional allowable error, then it can be shown that the $$T=(C-1\tfrac{1}{2})S$$

and $$fT=\tfrac{1}{2}\,S$$

from which the required number of drum channels and the spacing S of the enabling pulses E are:

$$S=2fT$$
$$C\geqq 1\tfrac{1}{2}+\tfrac{1}{2}\,f$$

In the specific illustrative embodiment in Fig. 4, it has been assumed that an accuracy of 10 percent is desired, i. e., $$f=0.1$$

Therefore, the number of conditions required must be at least 6.5, which dictates the employment of three channels on a binary basis. In other instances in which it may be desirable to time a condition for a period of several minutes or longer to within an accuracy of milliseconds, additional counter channels would be required.

In the embodiment depicted in Fig. 4, the occurrence of the condition on a line 12 will cause a mark to be written in channel A on drum 10 during the next timer enabling pulse E. In each of these operations, a write synchronizing pulse is also advantageously employed as in the embodiment of Fig. 1. This mark will be written in channel A, however, only if A has no mark present in it. If a mark is present in channel A, but no mark is present in channel B when a timer enabling pulse E occurs during the presence of some condition being timed, then a mark is written in channel B. Similarly, if a mark is present in channel A and in channel B, but none in channel C, a mark is written under these conditions in channel C.

The erasure requirements can be summarized as follows: the mark in channel A is erased on the occurrence of the timer enabling pulse while the timed condition persists if there is a mark already in A, on the cessation of the condition being timed, or on operation of the work circuit 32 following completion of the timed interval; the mark in channel B is erased, in this specific embodiment, on the occurrence of the timer enabling pulse while the timed condition persists if there is a mark already in A and in B and no mark in C, on cessation of the condition being timed, or on operation of the work circuit 32; a mark in channel C is erased on cessation of the condition being timed if there is no mark in B, or on operation of the work circuit 32. In this specific embodiment, the condition that there be no mark in channel C for erasure of the mark in channel B is advantageously specific to prevent the circuit from going from a condition in which marks are present in all channels to one in which marks are present in no channels on a timed condition of longer duration than the capacity of the counter.

The operation of this specific embodiment may be seen from the following table, wherein a 1 represents a mark present in a channel and a 0 the absence of a mark in that channel:

| Channel | | | Duration of Timing | Condition of Timer |
|---|---|---|---|---|
| C | B | A | | |
| 0 | 0 | 0 | 0 | Normal. |
| 0 | 0 | 1 | 1S | Start Timing. |
| 0 | 1 | 0 | 2S | |
| 0 | 1 | 1 | 3S | |
| 1 | 0 | 0 | 4S | |
| 1 | 0 | 1 | 5S | |
| 1 | 1 | 0 | 6S | End Timing. |
| 1 | 1 | 1 | 7S | |

In the embodiment illustrated in Fig. 4, the AND logic circuit 56 causes operation of the work circuit 32 on the presence of outputs from only the reading amplifiers 57 and 58 of the B and C channels, respectively, corresponding to a duration of timing 6S, as indicated above. The outputs of the reading amplifier 59 of channel A and reading amplifier 57 of channel B are fed to the AND control logic circuits 61 and 62 for controlling the writing in their respective channels and, through inverters 64 and 65, to the AND control logic circuits 66 and 67 for controlling the erasing in their respective channels.

Figure 5:
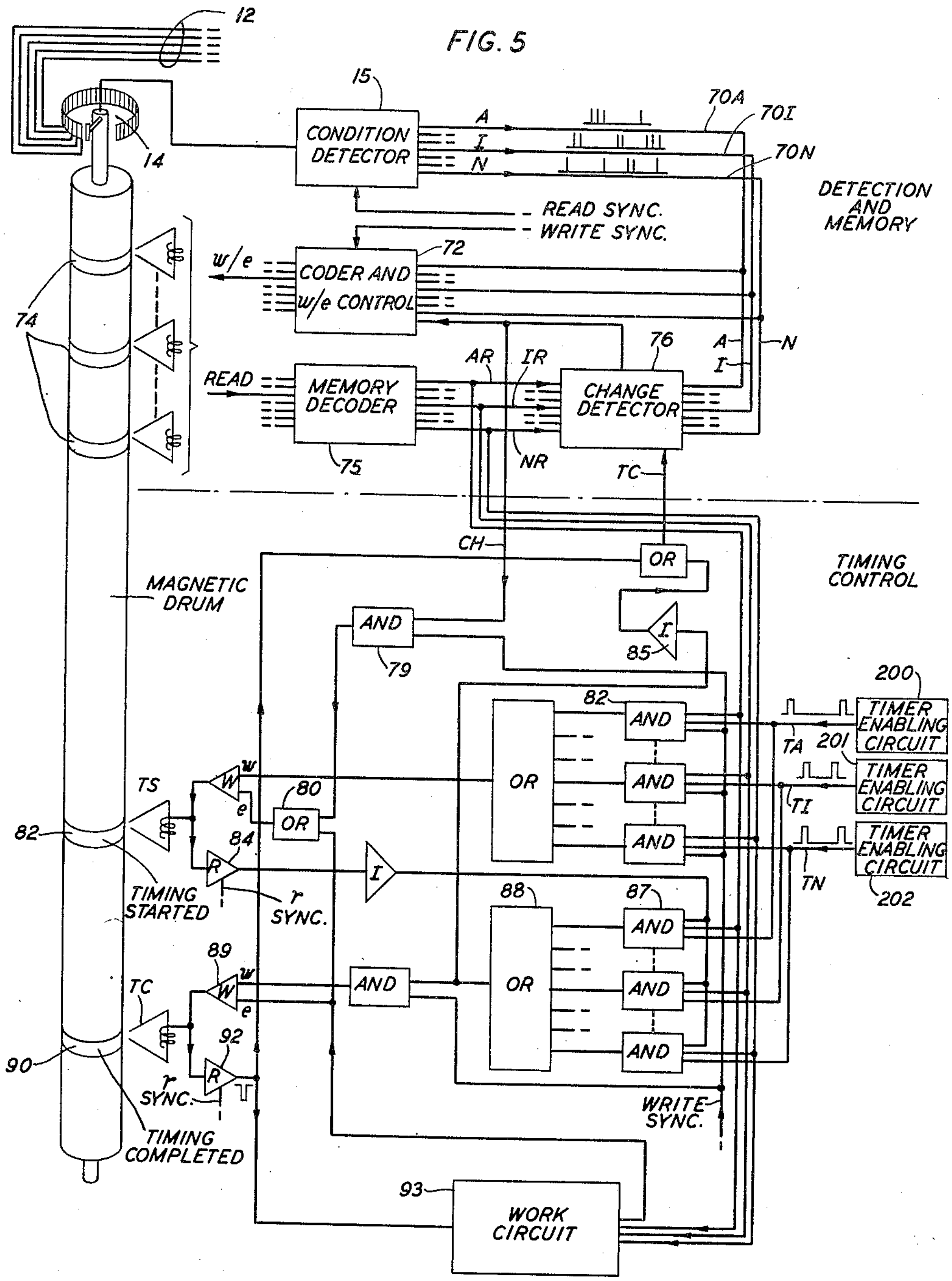
Fig. 5 is a schematic representation, mainly in block form, of another specific embodiment of this invention wherein any one of a number of possible and mutually exclusive conditions on any line is timed for a unique period.

In the specific illustrative embodiment of this invention depicted in Fig. 5, any one of a number of mutually independent conditions occurring on a given line may be timed for a predetermined, and different, interval in accordance with the principles of this invention. Turning now to that figure, a separate lead 70 extends from the condition detector for each possible condition to be timed, as in the embodiment illustrated in Fig. 1. In that embodiment, however, a separate timing circuit in accordance with this invention was employed for each condition. In accordance with this embodiment of this invention, each of the leads 70 is connected to a coder and writing/erasing control circuit 72 which writes the particular condition to be timed in a code in a series of memory channels 74. These coded marks are read and applied to a memory decoder circuit 75 and from the decoder circuit 75 to a change detector circuit 76.

Let us assume that a timeable condition A has just occurred on a line 12, which condition will produce a signal on lead 70A. This will cause marks to be written in the memory channels 74 along the slot assigned to that line 12 indicating that a condition A is to be timed. On each subsequent revolution of the drum 10 this coded information is read and decoded by the memory decoder circuit 75 and compared by a change detector circuit 76 with the present condition of line 12. When the timeable condition first occurs, the memory decoder circuit 75 will present to the change detector circuit the prior condition of the memory channels, and the change in condition of line 12 will be detected causing an enabling pulse to be delivered to an AND circuit 79 which, when the write synchronizing pulse occurs and in the absence of a pulse from inverter 85, as explained further below, enables an OR circuit 80 which causes erasure of whatever had been written in the timing started channel 82 on the drum 10. Thus, each time a condition on one of the lines 12 changes and in the absence of a pulse from inverter 85, the timing started channel 82 is erased.

The condition A of line 12 can change either during the occurrence of a timer enabling pulse from the A timer enabling circuit 200 or, as is more likely, before the occurrence of such a pulse. In either case the conjoint presence of the timer enabling pulse, the pulse on line AR from the memory decoder, as described below, and a write synchronizing pulse causes operation of AND circuit 82, thereby causing a mark to be written in the timing started channel 82. If, before the next occurrence of the timer enabling pulse from the A timer enabling circuit 200, the condition of the line 12 changes, this change causes an erasure of the mark in the timing started channel 82.

When the next enabling pulse occurs from the timer enabling circuit 200, the presence of that pulse, a write synchronizing pulse, and an inverted read out pulse from the reading amplifier 84 of the timing started channel 82 cause a pulse to be transmitted through the AND circuit 87 and the OR circuit 88 to the writing amplifier 89 of the timing completed channel 90, and an output pulse from the reading amplifier 92 is applied on the next revolution of the drum to a work circuit 93 as in the prior embodiments.

If a condition priorly present on a line 12 ceases during the timer enabling pulse, the erasure of what was present in the timer started channel 82 and in the memory channels 74 must be delayed to prevent a timing completed mark being written in channel 90 at the same time that a change in the memory channels 74 was being made, thereby resulting in an erroneous result. This is attained in this embodiment by having the output of the OR circuit 88 applied, through inverter 85, to prevent operation of the change detector 76 during the drum revolution that the timer enabling pulse is present together with a timing started mark. As this pulse is applied to inverter 85 only when a circuit 87 operates, each timer enabling pulse, from timer enabling circuits 201, 202, etc., is effective to disable the change detector 76 only when the condition on which timing has started corresponds with the particular enablement. The output of inverter 85 is applied to the change detector circuit 76 to disable that circuit and thus indirectly the AND circuit 79. After a timing completed mark has been written, the read output of channel 90 also disables the change detector 76 so that the memory record in channels 74 will not be altered until the work circuit 93 has responded to the timed condition.

Figure 6:
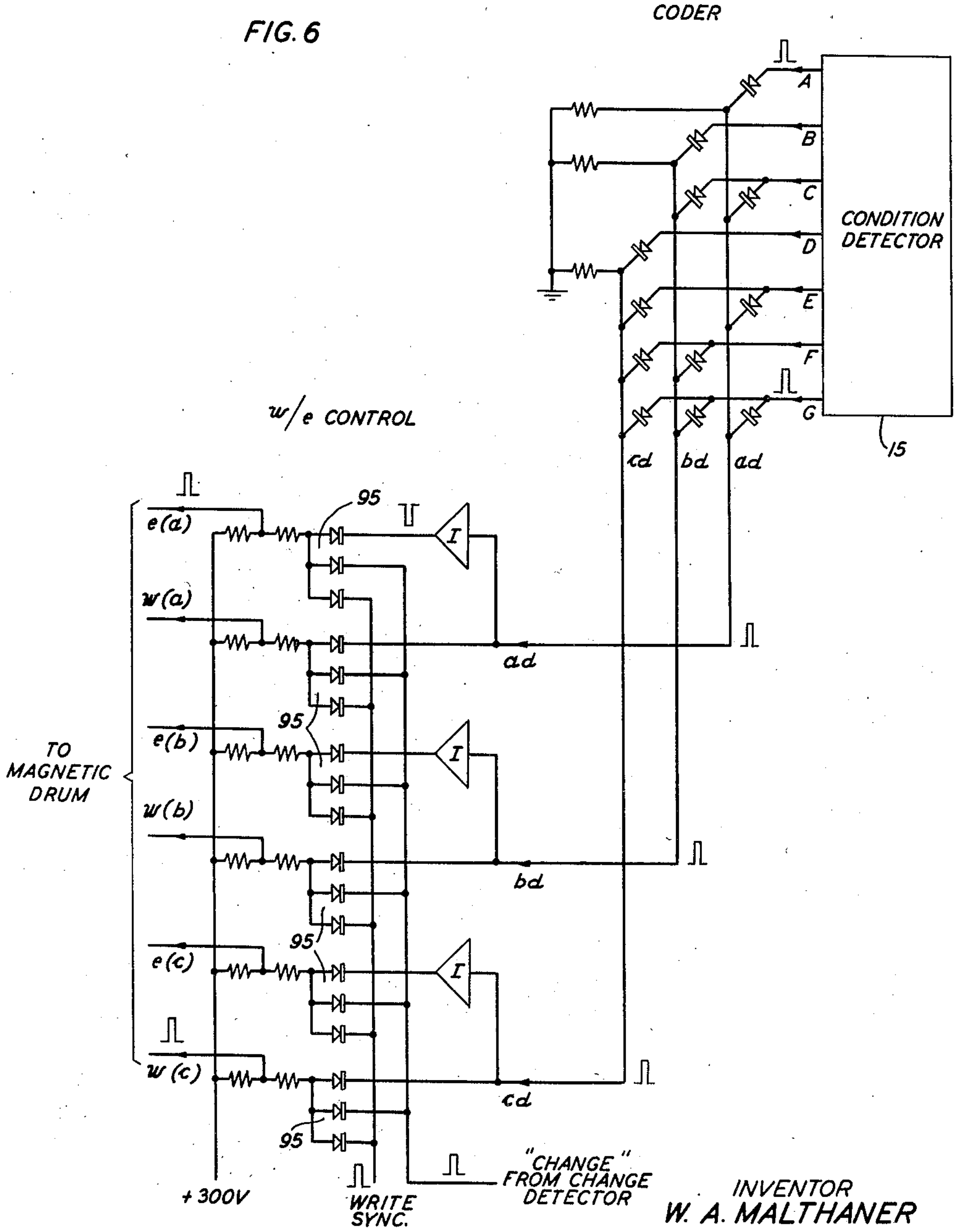
Fig. 6 is a schematic representation of one coder and write/erase control circuit employable in the embodiment of Fig. 5.
Figure 7:
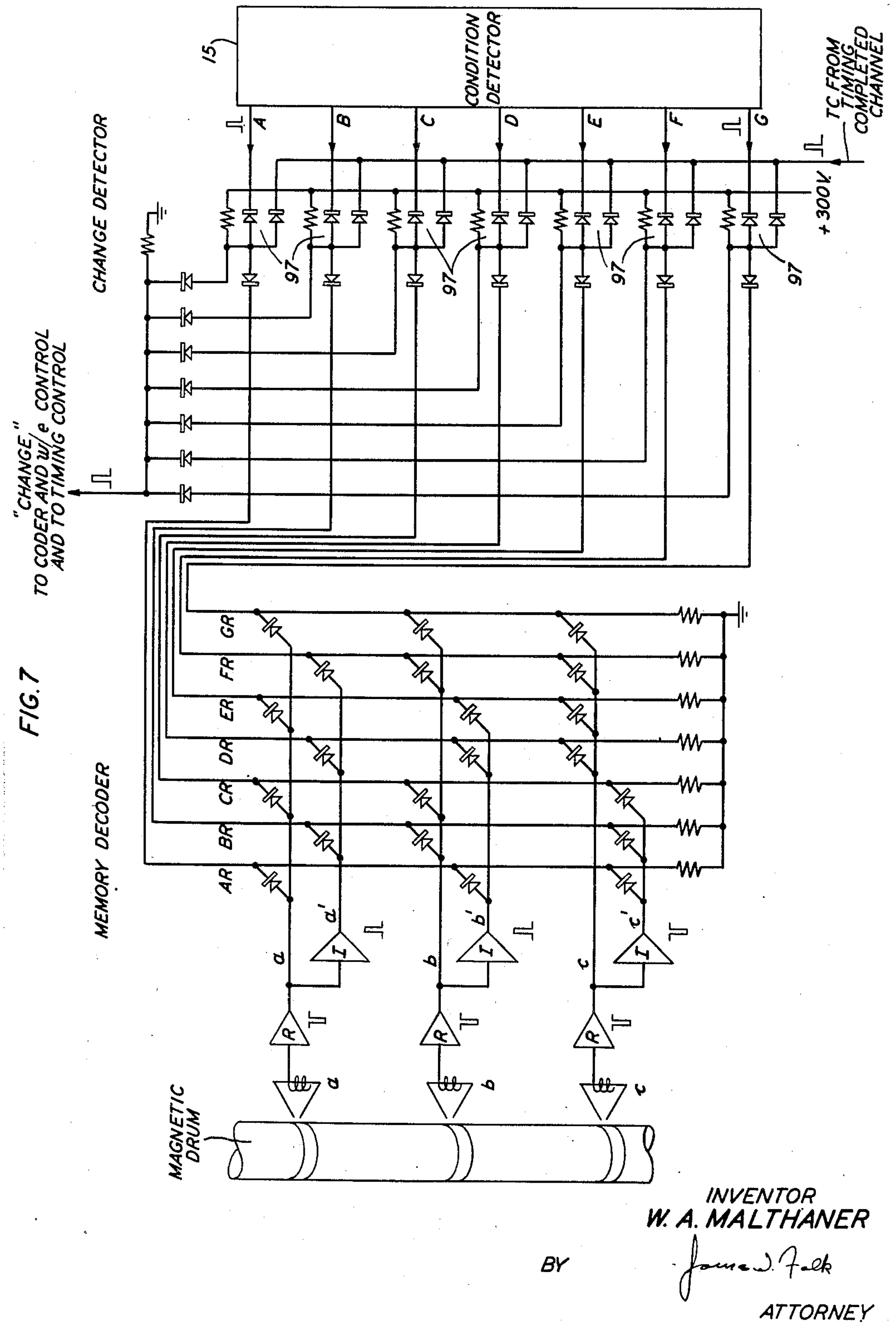
Fig. 7 is a schematic representation of a memory decoder circuit and a change detector circuit employable in the embodiment of Fig. 5.

Specific embodiments of a coder and write/erase control circuit 72, memory decoder circuit 75, and change detector circuit 76 are depicted in Figs. 6 and 7. Referring now to Fig. 6, the circuit there depicted assumes that there are seven mutually independent conditions, A through G, which may occur on each of the lines 12. By combining the inputs from the condition detector circuit 15 by means of four-input positive OR gates, as shown, and applying the outputs of these gates to six three-input positive AND gates 95, it is possible to write an identifying record of the presence of a condition A through G in but three channels 74*a*, *b*, and *c*, in accordance with the following table, a 1 indicating a mark:

| Scanned Condition | Memory Code | | |
|---|---|---|---|
| | *c* | *b* | *a* |
| 0 | 0 | 0 | 0 |
| A | 0 | 0 | 1 |
| B | 0 | 1 | 0 |
| C | 0 | 1 | 1 |
| D | 1 | 0 | 0 |
| E | 1 | 0 | 1 |
| F | 1 | 1 | 0 |
| G | 1 | 1 | 1 |

It is apparent that more conditions could be detected by employing an additional channel 74 with this code, or that other codes could be utilized.

As discussed above, a mark is only written or erased in one of the channels *a*, *b*, or *c* if a change has occurred in the condition of a line 12. Therefore, one of the conditions applied to each AND gate 95 is that there be a change pulse present from the change detector circuit 76, one specific embodiment of which is shown in Fig. 7. That circuit comprises a match logic circuit 97 for each condition A through G and compares the present condition of each line 70 with the condition of the line just read from the drum, i. e., the condition present during the last prior revolution of the drum. This condition is indicated by the presence or the absence of a pulse on leads AR, BR, etc., from the memory decoder circuit, one specific embodiment of which is also shown in Fig. 7, and which may advantageously comprise a logic matrix comprisingly seven three-input negative AND gates, arranged in accordance with the above code.

Thus, by noting the condition of each line 12 at each revolution of the drum for the presence of any one of a desired number of mutually independent conditions, a circuit in accordance with this invention can be employed to time the presence of any of those conditions for their prescribed and different periods of time.

It is to be understood that the above-described arrangements are merely illustrative of the application of the principles of the invention. Numerous other arrangements may be devised by those skilled in the art without departing from the spirit and scope of the invention.

What is claimed is:

1. A timing circuit comprising alterable memory means having a plurality of memory sections each comprising a plurality of memory elements, means for successively reading the condition of each memory element of a memory section, means for detecting a condition to be timed, means for generating a timer enabling pulse at regular predetermined intervals, each of said pulses being of a duration sufficient for said reading means to read the condition of each memory element of a memory section exactly once, means for placing a mark in a memory element in a first memory section on the first simultaneous occurrence of said condition and one of said timer enabling pulses, means for placing a mark in a memory element in a second memory section on the simultaneous occurrence of the output from said reading means for said first memory section and one of said timer enabling pulses, and means for removing said mark in said first memory section on cessation of said condition before the placing of said mark in said second memory section.

2. A timing circuit comprising alterable memory means having a plurality of memory sections each comprising a plurality of memory elements, means for successively reading the condition of each memory element of a memory section, means for detecting a condition to be timed, means for generating a timer enabling pulse at regular predetermined intervals, each of said pulses being of a duration sufficient for said reading means to read the condition of each memory element of a memory section exactly once, means for placing a mark in a timing started memory section of said memory means on the first simultaneous occurrence of said condition and one of said timer enabling pulses, means for placing a mark in a timing completed memory section of said memory means on the simultaneous occurrence of the output from said reading means for said timing started memory section and the next of said timer enabling pulses, and means for erasing said mark in said timing started memory section on cessation of said condition before the placing of said mark in said timing completed memory section.

3. A timing circuit comprising alterable memory means having a plurality of memory sections each comprising a plurality of memory elements, means for successively reading the condition of each memory element of a memory section, means for detecting a condition to be timed, means for generating a timer enabling pulse at regular predetermined intervals, each of said pulses being of a duration sufficient for said reading means to read the condition of each memory element of a memory section exactly once, means for placing marks in a plurality of memory sections of said memory means in a code on the simultaneous occurrences of said condition and said timer enabling pulses, said code being indicative of the number of such consecutive simultaneous occurrences, and means for erasing said marks on cessation of said condition before the placing of a predetermined code in said channels.

4. A timing circuit comprising alterable memory means having a plurality of memory sections each comprising a plurality of memory elements, means for successively reading the condition of each memory element of a memory section, a plurality of lines, each of said lines having an assigned memory element in each of said memory sections, means for scanning said lines, means cooperating with said scanning means for detecting the presence of any one of a plurality of mutually exclusive conditions on any of said lines, means for generating a timer enabling pulse at regular intervals for each of said mutually exclusive conditions, each of said pulses being of a duration sufficient for said reading means to read the condition of each memory element of a memory section exactly once, means responsive to the presence of a condition on one of said lines and to said timer enabling pulse for said condition for marking the start of the timing period in one of said memory sections, means responsive to a subsequent timer enabling pulse for said one condition, the continued presence of said condition, and said mark in said one memory section for marking the completion of said timing period in another of said memory sections, means for detecting a change in the condition present on said lines, and means for erasing said mark in said one memory section on detection by said last mentioned means of a change in the condition of said one line before the completion of said timing period.

5. A timing circuit comprising a magnetic drum having a plurality of channels thereon, means for detecting a condition to be timed, means for generating a timer enabling pulse at regular predetermined intervals, each of said pulses being of a duration of exactly one revolution of said drum, means for placing a mark in a first channel of said drum on the first simultaneous occurrence of said condition and one of said timer enabling pulses, means for reading said mark in said first channel, means for placing a mark in a second channel of said drum on the simultaneous occurrence of the output from said reading means and one of said timer enabling pulses, and means for erasing said mark in said first channel on cessation of said condition before the writing of said mark in said second channel.

6. A timing circuit comprising a magnetic drum having a plurality of channels thereon, a plurality of lines, each of said lines having an assigned slot on said drum, means for scanning said lines, means for cooperating with said scanning means for detecting the presence of a condition to be timed on any of said lines, means for generating timer enabling pulses at regular predetermined intervals, each of said pulses lasting exactly one revolution of said drum, means for placing a mark in a first channel of said drum on the first simultaneous occurrence of said condition on a line and one of said timer enabling pulses, said mark being placed in the cell in said channel assigned to said one line, means for reading said mark in said first channel, means for placing a mark in a cell in a second channel of said drum on the simultaneous occurrence of the output from said reading means and one of said timer enabling pulses, means for reading said mark in said second channel, means responsive to the output from said last-mentioned reading means for indicating the conclusion of said timing period, means for erasing said marks after operation of said last mentioned means, and means for erasing said mark in said first channel on cessation of said condition before the writing of said mark in said second channel.

7. A timing circuit comprising a magnetic drum having a plurality of channels thereon, means for detecting a condition to be timed, means for generating a timer enabling pulse at regular predetermined intervals, each of said pulses being of a duration of exactly one revolution of said drum, means for placing a mark in a timing started channel of said drum on the first simultaneous occurrence of said condition and one of said timer enabling pulses, means for reading said mark in said timing started channel, means for placing a mark in a timing completed channel of said drum on the simultaneous occurrence of the output from said reading means and the next of said timer enabling pulses, and means for erasing said mark in said timing started channel on cessation of said condition before the placing of said mark in said timing completed channel.

8. A timing circuit comprising a magnetic drum having a plurality of channels thereon, a plurality of lines, each of said lines having an assigned slot on said drum, means for scanning said lines, means cooperating with said scanning means for detecting the presence of a condition to be timed on any of said lines, means for generating timer enabling pulses at regular predetermined intervals, each of said pulses lasting exactly one revolution of said drum, means for placing a mark in a timing started channel of said drum on the first simultaneous occurrence of said condition on a line and one of said timer enabling pulses, said mark being placed in the cell in said timing started channel assigned to said one line, means for reading said mark in said timing started channel, means for placing a mark in a cell in a timing completed channel of said drum on the simultaneous occurrence of the output from said reading means and the next of said timer enabling pulses, means for reading said mark in said timing completed channel, means responsive to the output from said last-mentioned reading means for indicating the conclusion of the timing period, means for erasing said marks after operation of said last-mentioned means, and means for erasing said mark in said timing started channel on cessation of said condition before the writing of said mark in said timing completed channel.

9. A timing circuit comprising a magnetic drum having a plurality of channels thereon, means for detecting a condition to be timed, means for generating a timer enabling pulse at regular predetermined intervals, each of said pulses being of a duration of exactly one revolution of said drum, means for placing marks in a plurality of channels of said drum in a code on the simultaneous occurrences of said condition and said timer enabling pulses, said code being indicative of the number of such consecutive simultaneous occurrences, means for reading said marks, and means for erasing said marks on cessation of said condition before the placing of a predetermined code in said channels.

10. A timing circuit comprising a magnetic drum having a plurality of channels thereon, a plurality of lines, each of said lines having an assigned slot on said drum, means for scanning said lines, means cooperating with said scanning means for detecting the presence of a condition to be timed on any of said lines, means for generating timer enabling pulses at regular predetermined intervals, each of said pulses lasting exactly one revolution of said drum, means for placing a mark in a first channel of said drum on the first simultaneous occurrence of said condition on a line and one of said timer enabling pulses, said mark being placed in the cell in said channel assigned to said line, means for reading said mark in said first channel, means for placing marks in other channels of said drum in a pedetermined code on subsequent simultaneous occurrences of said timer enabling pulses, said condition and said mark in said first and other channels in said code, means responsive to a predetermined arrangement of said marks in said code for indicating the conclusion of the timing period, and means for erasing said marks in said channels on cessation of said condition before the placing of said predetermined arrangement of marks in said channels.

11. A timing circuit comprising a magnetic drum having a plurality of marking channels thereon, means for detecting a plurality of mutally exclusive conditions, means for generating a timer enabling pulse at regular predetermined intervals for each of said mutually exclusive conditions, each of said pulses being of a duration of exactly one revolution of said drum, means for marking in certain of said channels the presence of one of said conditions, means responsive to the timer enabling pulse for said one condition and to the presence of said condition for marking the start of the timing period in one of said channels, means responsive to a subsequent timer enabling pulse for said one condition, the continued presence of said conditions, and said mark in said one channel for marking the completion of said timing period in another of said channels, means for reading from said certain channels on each revolution of said drum the prior condition marked therein, means for comparing said prior condition with the present condition, and means for erasing said marks in said channels on detection by said last-mentioned means of a change in said condition before the completion of said timing period.

12. A timing circuit comprising a magnetic drum having a plurality of marking channels thereon, a plurality of lines, each of said lines having an assigned slot on said drum, means for scanning said lines, means cooperating with said scanning means for detecting the presence of any one of a plurality of mutally exclusive conditions on any of said lines, means for generating a timer enabling pulse at regular intervals for each of said mutually exclusive conditions, each of said pulses being of a duration of exactly one revolution of said drum, means responsive to the presence of a condition on one of said lines and to said timer enabling pulse for said condition for marking the start of the timing period in one of said channels, means responsive to a subsequent timer enabling pulse for said one condition, the continued presence of said condition, and said mark in said one channel for marking the completion of said timing period in another of said channels, means for detecting a change in the condition present on said lines, and means for erasing said mark in said one channel on detection by said last-mentioned means of a change in the condition of said one line before the completion of said timing period.

13. A timing circuit in accordance with claim 12 wherein said means for detecting change in the condition present on said lines comprises means for marking in a plurality of channels on said drum the present condition of each of said lines, means for reading said plurality of channels on each revolution of said drum, means for comparing the output of said reading means with the condition present on each of said lines, and means for erasing the marks for a line in said plurality of channels on detection by said comparing means of a change in the condition of said line.

14. A timing circuit in accordance with claim 13 wherein said marking means includes coding means for marking said channels in accordance with a code dependent on the particular condition present on any one of said lines and said reading means includes means for decoding from said code.

References Cited in the file of this patent

UNITED STATES PATENTS

| | | |
|---|---|---|
| 1,883,907 | Hathaway | Oct. 25, 1932 |
| 2,378,388 | Begun | June 19, 1945 |
| 2,540,654 | Cohen et al. | Feb. 6, 1951 |